US008051279B2

(12) United States Patent  
Chiu et al.

(10) Patent No.: US 8,051,279 B2
(45) Date of Patent: Nov. 1, 2011

(54) METHOD AND SYSTEM FOR ENABLING AN AUXILIARY SYSTEM TO RETRIEVE SYSTEM INFORMATION FROM A COMPUTING DEVICE

(75) Inventors: Ming-Lung Chiu, Gueishan Township, Taoyuan County (TW); Arman Toorians, San Jose, CA (US); Aleksandr Frid, San Francisco, CA (US); Chung-Yuan Huang, Taipei (TW); Chia-Ching Lin, Panchaug (TW); Chien-Ting Yeh, Linkou Shiang (TW)

(73) Assignee: NVIDIA Corporation, Santa Clara, CA (US)

( * ) Notice: Subject to any disclaimer, the term of this patent is extended or adjusted under 35 U.S.C. 154(b) by 841 days.

(21) Appl. No.: 11/964,996

(22) Filed: Dec. 27, 2007

(65) Prior Publication Data
US 2009/0172205 A1 Jul. 2, 2009

(51) Int. Cl.
 G06F 1/00 (2006.01)
 G06F 1/26 (2006.01)
 G06F 9/00 (2006.01)
 G06F 15/177 (2006.01)
(52) U.S. Cl. .................................. 713/1; 713/2; 713/300
(58) Field of Classification Search .................. 713/1, 2, 713/300, 320
 See application file for complete search history.

(56) References Cited

U.S. PATENT DOCUMENTS

| 7,577,771 | B2 * | 8/2009 | Steeb et al. | 710/20 |
| 7,711,868 | B2 | 5/2010 | Rhoten et al. | |
| 2005/0064911 | A1 * | 3/2005 | Chen et al. | 455/566 |
| 2007/0052615 | A1 | 3/2007 | Van Dongen et al. | |
| 2007/0239920 | A1 * | 10/2007 | Frid | 710/306 |
| 2008/0235527 | A1 * | 9/2008 | Heller et al. | 713/320 |
| 2008/0247128 | A1 * | 10/2008 | Khoo | 361/681 |
| 2008/0297433 | A1 * | 12/2008 | Heller et al. | 345/2.1 |
| 2009/0021450 | A1 * | 1/2009 | Heller et al. | 345/1.3 |
| 2009/0085868 | A1 * | 4/2009 | Lai | 345/157 |
| 2009/0117890 | A1 * | 5/2009 | Jacobsen et al. | 455/419 |

OTHER PUBLICATIONS

Andrew Fuller, Auxiliary Display Platform in Longhorn, Microsoft Corp., 2005, slides 1-29.*
Chang, Darius, LG R200-Q (Core 2 Duo T7300 Processor 2.0GHz, 1GB RAM), Nov. 8, 2007.*
Dragos, LG's XNOTE R200 With Windows SideShow Hit Korean Market, Oct. 16, 2007.*
Admin, Winbond's Sideshow Embedded Controller And SDK, Feb. 6, 2007.*
Winbond To Demonstrate Innovative "ShowMe" Family And Security Solutions For Microsoft Windows Vista At WinHec 2006, Jun. 12, 2006.*
White, How Computers Work, 2002, Que Corporation, 6$^{th}$ Ed., pp. 16-17.*
Office Action dated Jul. 30, 2010. KR 10-2008135001.
KR Office Action, Ser. No. 10-2008-135001, received Jul. 5, 2011.

* cited by examiner

*Primary Examiner* — Mark Connolly
(74) *Attorney, Agent, or Firm* — Patterson & Sheridan, LLP

(57) ABSTRACT

A method and system for enabling an auxiliary system to retrieve the system information from a computing device are disclosed. Specifically, one embodiment of the present invention sets forth a method, which includes the steps of requesting for the system information from an embedded controller of the computing device through a first bi-directional data bus if the computing device is shut down, requesting for the system information from the computing device through the first bi-directional bus during the boot-up sequence of the computing device, and requesting for the system information from the computing device through a general purpose input/output (GPIO) after the computing device completes the boot-up sequence.

17 Claims, 4 Drawing Sheets

METHOD AND SYSTEM FOR ENABLING AN AUXILIARY SYSTEM TO RETRIEVE SYSTEM INFORMATION FROM A COMPUTING DEVICE

BACKGROUND OF THE INVENTION

1. Field of the Invention

The present invention relates to a Windows SideShow technology, and more particularly, to a method and system for enabling a SideShow device to retrieve system information from a computing device.

2. Description of the Related Art

Unless otherwise indicated herein, the approaches described in this section are not prior art to the claims in this application and are not admitted to be prior art by inclusion in this section.

Windows Vista™ is a commercially available operating system from Microsoft Corporation of Redmond, Wash., hereinafter referred to as WINDOWS VISTA. With WINDOWS VISTA operating systems becoming the dominant operating systems for personal computers, a variety of software or hardware applications compatible with Vista-based computer systems are also becoming more and more popular. One of the Vista-based software/hardware applications is Windows SideShow, which is a technology that supports an auxiliary screen to the Vista-based computer system.

A conventional SideShow device is configured to display system information, such as time, system temperature, or battery condition of a computing device to which the SideShow device is connected. To display the system information, the conventional SideShow device passively waits for the computing device to not only to monitor but also to retrieve its system information. In addition, the conventional SideShow device relies on WINDOWS VISTA operating system on the computing device to establish a connection between the computing device and the SideShow device to send the system information. In the event the operating system of the computing device crashes or simply shuts down, the monitoring, retrieving, or establishing of the connection activities also stop. As a result, the SideShow device has no way to obtain the system information of the computing device.

To illustrate, FIG. 1 is a simplified block diagram illustrating a conventional computer system 100 supporting WINDOWS VISTA and the SideShow technology. The computer system 100 includes a computing device 102 and a SideShow device 104. The computing device 102 and the SideShow device 104 are connected via a standardized data bus 106, such as a Universal Serial Bus (USB) or a Bluetooth connection. The computing device 102 runs Window Vista operating system 110, and the SideShow device 104, as an auxiliary system, is configured to receive and display system information 112 of the computing device 102, such as battery condition 114, fan speed 116, system time 118, system state (e.g., active or not) 120, and other diagnostic information 122 on an auxiliary display. As mentioned above, the operating system of the computing device 102 is responsible for obtaining the system information 112, establishing the standardized data bus 106, and sending the information via the data bus to the SideShow device 104. If the computing device 102 shuts down (i.e., the WINDOWS VISTA 110 stops running) or the WINDOWS VISTA 110 simply stops to function properly, the SideShow device 104 stops getting the system information 112. Furthermore, since the SideShow device 104 is configured to passively receive the system information 112 from the computing device 102, the SideShow device 104 is incapable of causing certain actions carried out by the computing device 102 to be suspended.

What is needed in the art is thus a method and system that enable the SideShow device to retrieve the system information from the computing device, regardless of the operating state of the computing device, and addresses at least the problems set forth above.

SUMMARY OF THE INVENTION

A method and system for enabling an auxiliary system to retrieve the system information from a computing device are disclosed. Specifically, one embodiment of the present invention sets forth a method, which includes the steps of requesting for the system information from an embedded controller of the computing device through a first bi-directional data bus if the computing device is shut down, requesting for the system information from the computing device through the first bi-directional bus during the boot-up sequence of the computing device, and requesting for the system information from the computing device through a general purpose input/output (GPIO) after the computing device completes the boot-up sequence.

At least one advantage of the present invention disclosed herein is to enable the transfer of certain system information of the computing device to the auxiliary system, such as the SideShow device, regardless of the availability of WINDOWS VISTA operating system and the USB or Bluetooth connection between the auxiliary system and the computing device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the drawings. It is to be noted, however, that the drawings illustrate only typical embodiments of this invention and are therefore not to be considered limiting of its scope, for the invention may admit to other equally effective embodiments.

DETAILED DESCRIPTION

Throughout this description, a computer system may include a main system and an auxiliary system. The main system typically is configured with a feature-rich operating system, such as WINDOWS VISTA, and much computing resources, such as central processing units (CPUs) and memory systems. The auxiliary system, on the other hand, is typically configured with embedded software programs and limited hardware resources. A "primary display" broadly refers to the display mainly driven by the main system, and an "auxiliary display" broadly refers to the display that can be driven by either the main system or the auxiliary system. Here, an example of the main system is a laptop computer, and an example of the auxiliary system is a SideShow device coupled to the laptop computer.

Figure 1:
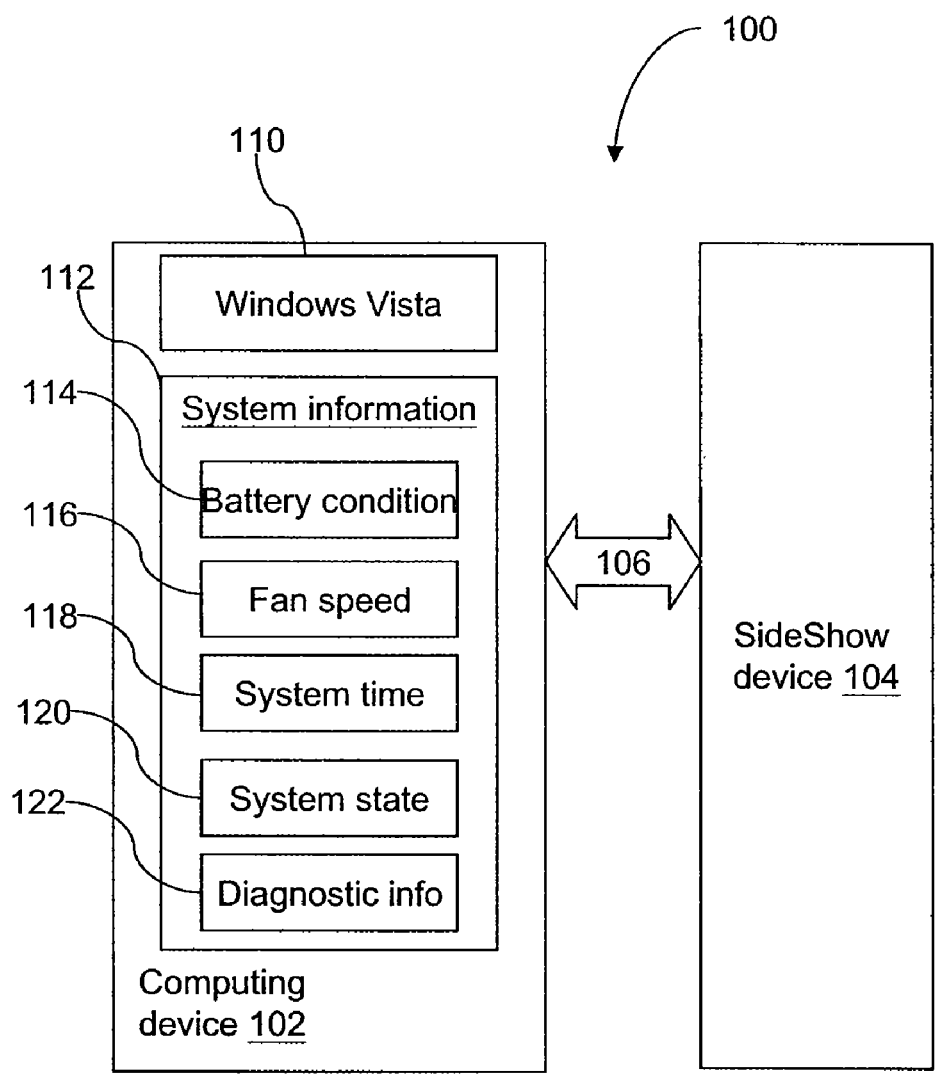
FIG. 1 is a simplified block diagram illustrating a conventional computer system supporting WINDOWS VISTA and the SideShow technology.
Figure 2:
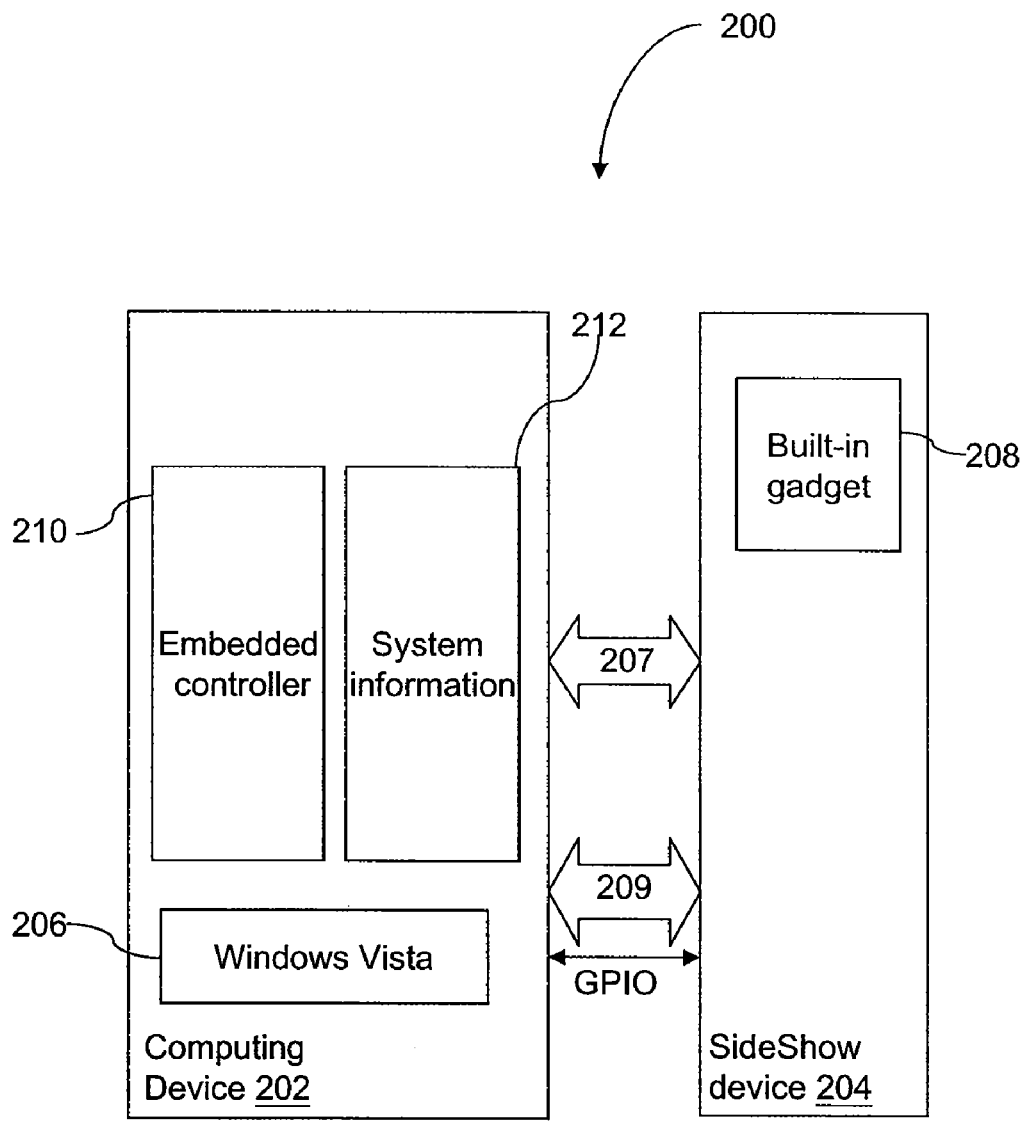
FIG. 2 is a simplified block diagram of a computer system, according to one embodiment of the present invention.

FIG. 2 is a simplified block diagram of a computer system 200, according to one embodiment of the present invention. The computer system 200 includes a computing device 202 and a SideShow device 204. The WINDOWS VISTA operating system 206-based computing device 202 includes an embedded controller 210, and the SideShow device 204 includes a built-in gadget 208. The embedded controller 210 operates even when the computing device 202 is in a shut down state or the operating system 206 is not running properly. In other words, the embedded controller 210 provides the SideShow device 204 with an opportunity to communicate with the computing device 202 irrespectively of the operating state of the operating system 206.

The SideShow device 204 actively gets the system information 212 from the computing device 202 through a bi-directional data bus 209, such as a system management bus (SMB). To achieve this goal, components in the computing device 202 that track or generate the system information 212, such as thermal sensors, fan speed controllers, clock generators, or battery monitors, all of which are not shown, are connected with the SMB bus supported by the computing device 202. Once the embedded controller 210 receives a request for the system information 212 from the SideShow device 204, the embedded controller polls the requested system information 212 and then sends it to the SideShow device 204 through the SMB bus. In one implementation, the components that track or generate the system information 212 receive queries from the embedded controller 210, and in response, place the queried information on the SMB bus. Since the SMB bus is a bi-directional data bus, the SideShow device 204 is configured to not only to send requests to the embedded controller 210 for system information but also to send commands to the embedded controller 210 to carry out. If the embedded controller 210 receives commands, then the controller sends the results of executing the commands back to the SideShow device 204.

Figure 3A:
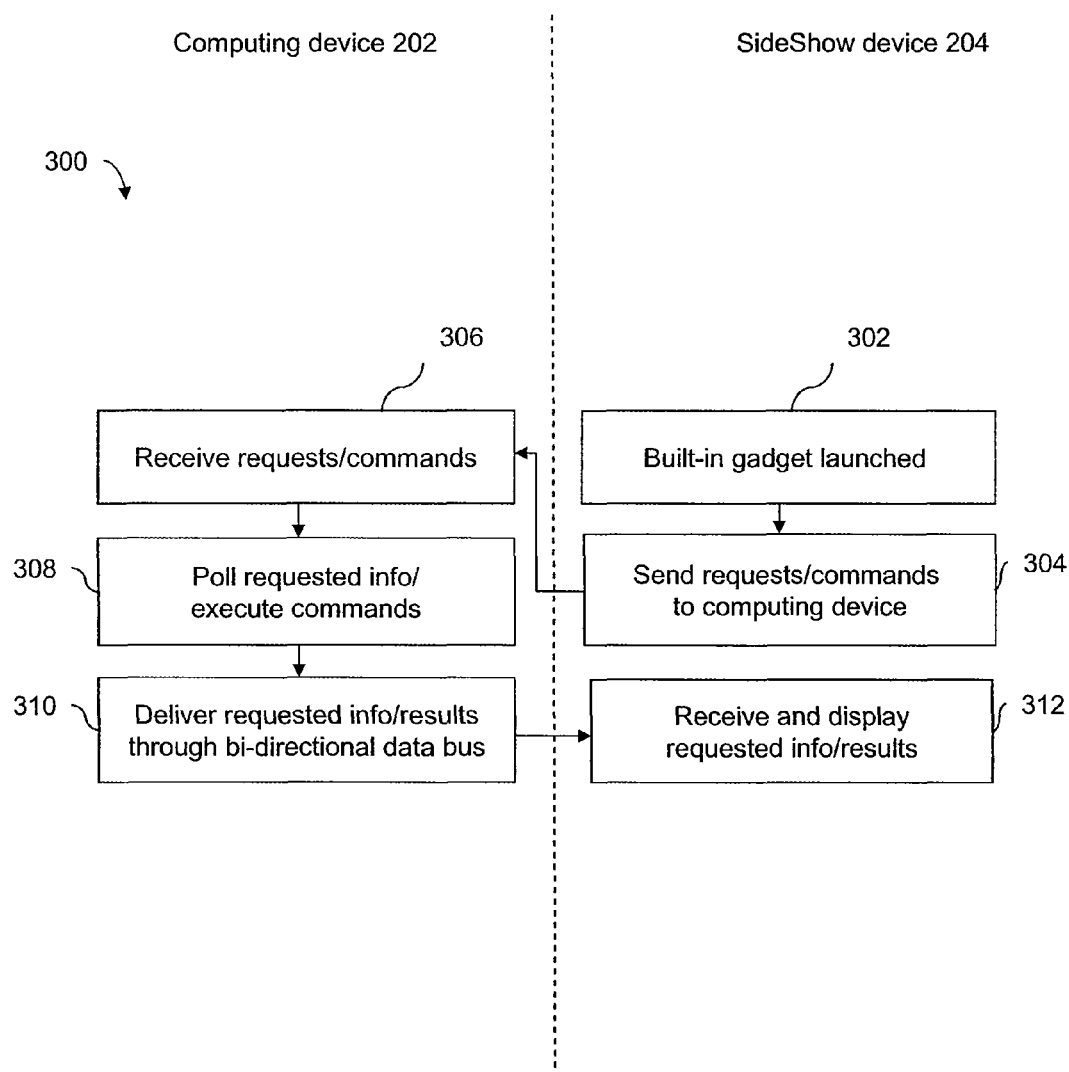
FIG. 3A is a flow chart illustrating a process of a SideShow device interacting with a computing device even if the computing device is shut down or the operating system on the computing device is not running properly, according to one embodiment of the present invention.

In conjunction FIG. 2, FIG. 3A is a flow chart illustrating a process 300 of the SideShow device 204 interacting with the computing device 202 even if the computing device 202 is shut down or the WINDOWS VISTA operating system 206 is not running properly, according to one embodiment of the present invention. Here, the embedded controller 210 of the computing device 202 is assumed to be operational. First, the built-in gadget 208 of the SideShow device 204 is manually launched in step 302, and the SideShow device 204 remains powered-on as it attempts to retrieve the system information 212. The built-in gadget 208 may request for the system information 212 from the computing device 202 or even send commands to the embedded controller 210 to be carried out in step 304. Once the built-in gadget 208 receives the requested system information or the results of having the commands executed, it causes the received information to be displayed in step 312 on the display device supported by the SideShow device 204.

When the embedded controller 210 receives the requests or commands from the built-in gadget 208 in step 306, the embedded controller 210 either responds to the requests by polling for the requested information or responds to the commands by executing them in step 308. In step 310, the requested information, such as the system information 212, or the results of executing the commands is delivered to the built-in gadget 208 through the SMB data bus.

It should be noted that any bi-directional data bus can be used in the present invention, and the SMB data bus is discussed above only as an example and shall not be construed to limit the scope of the claimed invention. For instance, for some of the components that track or generate the system information 212 in the computing device 202, such as the thermal sensors or the fan speed controllers, they can be connected to an I squared C (I2C) bus, which is largely compatible with the SMB bus. By using the bi-directional data bus 209 to retrieve the system information 212, the availability of a standardize data bus 207 supporting USB, Bluetooth, or other specifications recognized by WINDOWS VISTA operating system 206 is rendered irrelevant.

In other operating modes of the computing device 202, one implementation of the SideShow device 204 acquires data from the computing device 202 in a different manner than the aforementioned process of proactively requesting for data. In particular, as the computing device 202 goes through its boot-up procedure, the built-in gadget 208 passively receives certain boot-up related information from the computing device 202. After the computing device 202 finishes booting up and the operating system 206 begins to run, the built-in gadget 208 communicates with the computing device 202 through a general purpose input/output (GPIO).

Figure 3B:
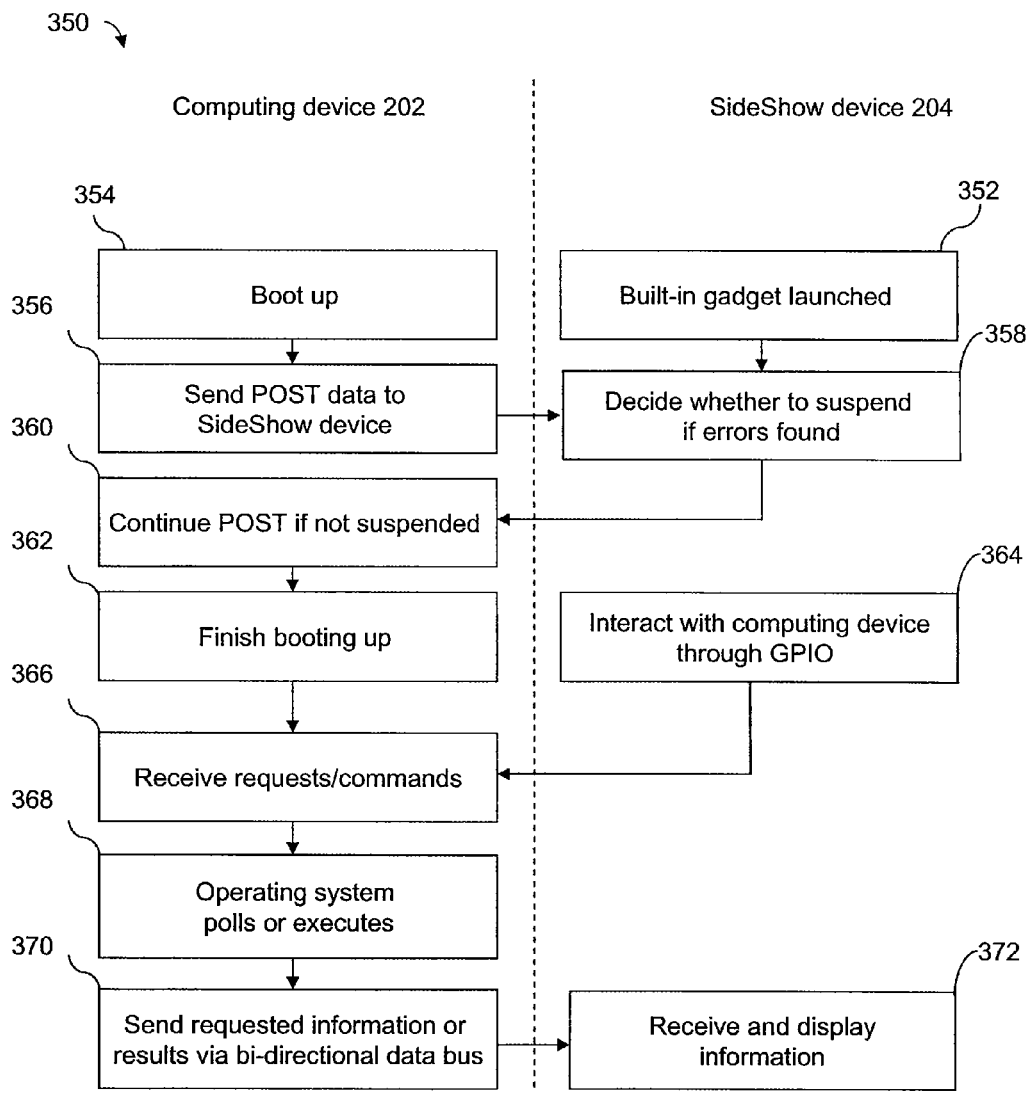
FIG. 3B is a flow chart illustrating another process of a SideShow device interacting with a computing device as the computing device boots up and the operating system on the computing device operates properly, according to one embodiment of the present invention.

More specifically, in conjunction with FIG. 2, FIG. 3B is a flow chart illustrating another process 350 of the SideShow device 204 interacting with the computing device 202 as the computing device 202 boots up and the operating system 206 operates properly, according to one embodiment of the present invention. Similar to the process 300 discussed above, the built-in gadget 208 is launched in step 352. As the computing device 202 starts booting up in step 354, it sends power-on self-test (POST) data through the bi-directional data bus 209 to the built-in gadget 208 in step 356. The POST procedure is shown on the display device of the SideShow device 204 in step 358. In one implementation, however, if the POST procedure encounters certain error conditions, the user of the built-gadget 208 is given a choice whether to suspend the POST procedure also in step 358. Here, the computing system 202 waits for a response from the built-in gadget 208 before continuing with the POST procedure in step 360. In other words, having the POST procedure related data sent to the SideShow device 204 during the boot-up sequence of the computing device 202 provides the user of the SideShow device 204 the intelligence to identify errors associated with the POST procedure and also to suspend the boot-up sequence to correct the errors. Absent such a mechanism, these POST-related errors cannot be identified and addressed quickly.

After the computing device 202 finishes booting up in step 362, WINDOWS VISTA 206 begins running, and the computing device 202 begins waiting for requests or commands from the built-in gadget 208. In one implementation, the built-in gadget 208 sends requests or commands to the computing device 202 by asserting pulse signals through general purpose input/output (GPIO) in step 364. Unlike the process 300 described above, after receiving the requests or commands in step 366, the operating system 206 then either polls the system information 212 according to the requests or causes the execution of the commands in step 368. Then, the operating system 206 causes the retrieved system information 212 or the results of executing the commands to be transferred to the built-in gadget 208 through the bi-directional data bus 209 for display in step 370. In step 372, the SideShow device 204 causes the received information to be displayed on its display device.

As has been demonstrated, according to one embodiment of the present invention, the SideShow device can be configured to proactively retrieve certain system information as opposed to passively waiting for it from the computing device to which it is attached. In addition, the system information from the computing device can be sent to the SideShow device through a different data bus other than the USB or Bluetooth connection typically supported by the SideShow device irrespective of the availability of WINDOWS VISTA running on the computing device or the USB or Bluetooth connection between the SideShow device and the computing device. Moreover, according to one aspect of the present invention, the computing device does not have to allocate its resources to continually monitor the system status. The Side-Show device, according to yet another aspect of the present invention, provides a user of the device opportunities to monitor and adjust certain operating conditions of the computing device.

The above description illustrates various embodiments of the present invention along with examples of how aspects of the present invention may be implemented. The above examples, embodiments, instruction semantics, and drawings should not be deemed to be the only embodiments, and are presented to illustrate the flexibility and advantages of the present invention as defined by the following claims.

We claim:

1. A computer system, comprising:
   a computing device configured with a feature-rich operating system, wherein the computing device further includes a plurality of components capable of obtaining system information; and
   an auxiliary system configured with a built-in gadget that requests the system information from the computing device through a first bi-directional data bus even when the computing device is in a shut down state,
   wherein the computing device initiates communication with the built-in gadget by sending power-on self-test (POST) data to the built-in gadget through the first bi-directional data bus during a boot-up sequence of the computing device, and the auxiliary system displays a POST procedure to enable a user to choose whether to suspend the POST procedure when an error condition is encountered.

2. The computer system of claim 1, wherein the built-in gadget sends a command to the computing device for execution through the first bi-directional data bus.

3. The computer system of claim 1, wherein the built-in gadget communicates with an embedded controller in the computing device to retrieve the system information even if the feature-rich operating system of the computing device fails to operate normally.

4. The computer system of claim 1, wherein the built-in gadget communicates with an embedded controller in the computing device to retrieve the system information even when the computing device is in the shut down state.

5. The computer system of claim 1, wherein the built-in gadget is capable of suspending the boot-up sequence if an error is detected during the boot-up sequence.

6. The computer system of claim 1, wherein the built-in gadget communicates with the computing device by asserting a signal through a general purpose input/output (GPIO) after the computing device completes the boot-up sequence.

7. The computer system of claim 1, wherein the computing device further connects to the auxiliary system through a second data bus.

8. The computer system of claim 1, wherein the built-in gadget requests the system information from the computing device irrespective of the operating state of the feature-rich operating system.

9. An auxiliary system, comprising:
   a processing unit; and
   a display device, wherein the processing unit is configured to execute the instructions for a built-in gadget, which when executed, causes the processing unit to request system information of a computing device coupled to the auxiliary system via a first bi-directional data bus even when the computing device is in a shut down state,
   wherein the auxiliary system receives power-on self-test (POST) data through the first bi-directional data bus from the computing device during a boot-up sequence of the computing device, and the auxiliary system displays a POST procedure to enable a user to choose whether to suspend the POST procedure when an error condition is encountered.

10. The auxiliary system of claim 9, wherein when the instructions for the built-in gadget are executed, causes the processing unit to send a command to the computing device through the first bi-directional data bus for execution.

11. The auxiliary system of claim 9, wherein when the instructions for the built-in gadget are executed, causes the processing unit to communicate with an embedded controller in the computing device to retrieve the system information even if the feature-rich operating system of the computing device fails to operate normally.

12. The auxiliary system of claim 9, wherein when the instructions for the built-in gadget are executed, causes the processing unit to communicate with an embedded controller in the computing device to retrieve the system information even when the computing device is in the shut down state.

13. The auxiliary system of claim 9, wherein when the instructions for the built-in gadget are executed, causes the processing unit to communicate with the computing device by asserting a signal through a general purpose input/output (GPIO) after the computing device completes the boot-up sequence.

14. The auxiliary system of claim 9, wherein the auxiliary system further connects to the computing device through a second data bus, and the auxiliary system is configurable to retrieve the system information from the computing device regardless of whether a connection between the computing device and the auxiliary system is established through the second data bus.

15. The auxiliary system of claim 9, wherein when the instructions for the built-in gadget are executed, causes the processing unit to retrieve the system information irrespective of the operating state of a feature-rich operating system running on the computing device.

16. A method for enabling a auxiliary system to retrieve system information from a computing device, comprising:
   requesting the system information from an embedded controller of the computing device through a first bi-directional data bus even when the computing device is shut down, wherein the system information is obtained by a plurality of components of the computing device; and
   receiving, by the auxiliary system, the system information from the computing device,
   wherein the auxiliary system receives power-on self-test (POST) data through the first bi-directional data bus from the computing device during a boot-up sequence of the computing device, and the auxiliary system displays a POST procedure to enable a user to choose whether to suspend the POST procedure when an error condition is encountered.

17. The method of claim 16, further comprising:
   requesting the system information from the computing device through the first bi-directional bus during the boot-up sequence of the computing device; and
   requesting the system information from the computing device through a general purpose input/output (GPIO) after the computing device completes the boot-up sequence.

* * * * *